(12) United States Patent
DeGeorge et al.

(10) Patent No.: US 12,202,737 B2
(45) Date of Patent: Jan. 21, 2025

(54) POROUS GARNET RIBBON BY REACTION SINTERING METHOD

(71) Applicant: CORNING INCORPORATED, Corning, NY (US)

(72) Inventors: Aaron David DeGeorge, Painted Post, NY (US); Barbara Anna Oyer, Hornell, NY (US); Soumyadyuti Samai, Paris (FR); Zhen Song, Painted Post, NY (US); Cameron Wayne Tanner, Horseheads, NY (US); Patrick David Tepesch, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 208 days.

(21) Appl. No.: 17/974,646

(22) Filed: Oct. 27, 2022

(65) Prior Publication Data

US 2023/0140520 A1 May 4, 2023

Related U.S. Application Data

(60) Provisional application No. 63/273,374, filed on Oct. 29, 2021.

(51) Int. Cl.
*H01M 10/0562* (2010.01)
*C01G 25/00* (2006.01)

(52) U.S. Cl.
CPC ...... *C01G 25/006* (2013.01); *H01M 10/0562* (2013.01); *C01P 2002/30* (2013.01); *C01P 2002/54* (2013.01); *C01P 2002/76* (2013.01); *C01P 2004/03* (2013.01); *C01P 2006/16* (2013.01); *C01P 2006/40* (2013.01); *H01M 2300/0077* (2013.01)

(58) Field of Classification Search
CPC . C01G 25/006; C01G 35/006; C01P 2002/30; C01P 2002/54; C01P 2002/76; C01P 2004/03; C01P 2006/16; C01P 2006/17; C01P 2006/40; H01M 10/052; H01M 10/0525; H01M 10/0562; H01M 2300/0071; H01M 2300/0077; Y02E 60/10

See application file for complete search history.

(56) References Cited

U.S. PATENT DOCUMENTS

2018/0219251 A1   8/2018   Rogren

FOREIGN PATENT DOCUMENTS

| CN | 109786816 A | 5/2019 |
| WO | 2017/116599 A2 | 7/2017 |

OTHER PUBLICATIONS

Fu et al; "Three-Dimensional Bilayer Garnet Solid Electrolyte Based High Energy Density Lithium Metal-Sulfur Batteries"; Energy Environ. Sci., 2017, 10, 1568, 8 pages.
Liu et al; "3D Lithium Metal Anodes Hosted in Asymmetric Garnet Frameworks Toward High Energy Density Batteries"; Energy Storage Materials 14 (2018), pp. 376-382.
Xu et al; "All-In-One Lithium-Sulfur Battery Enabled by a Porous-Dense-Porous Garnet Architecture"; Energy Storage Materials 15 (2018), pp. 458-464.
Xu et al; "Three-Dimensional, Solid-State Mixed Electron-Ion Conductive Framework for Lithium Metal Anode"; Nano Lett. 2018, 18, pp. 3926-3933.
Yang et al; "Continuous Plating/Stripping Behavior of Solid-State Lithium Metal Anode in a 3D Ion-Conductive Framework"; PNAS vol. 115, No. 15 (2018), pp. 3770-3775.

*Primary Examiner* — Lawrence D Ferguson

(57) ABSTRACT

The disclosure relates to porous garnet ribbons and methods of making such porous garnet ribbons.

13 Claims, 10 Drawing Sheets

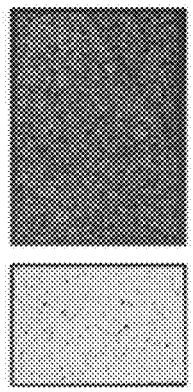
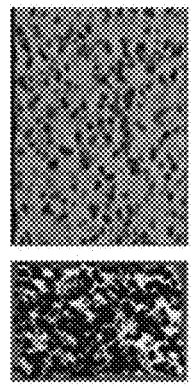
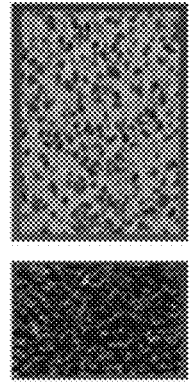
*FIG. 6A*  *FIG. 6B*  *FIG. 6C*
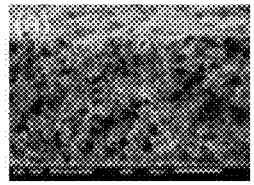  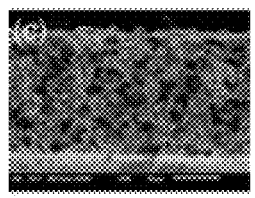 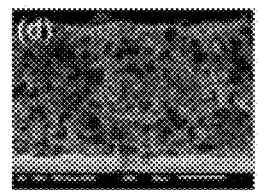
*FIG. 7A*  *FIG. 7B*  *FIG. 7C*  *FIG. 7D*
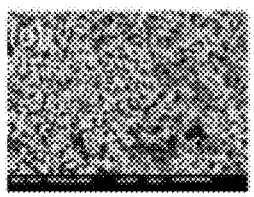 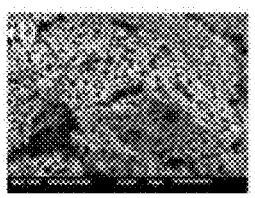 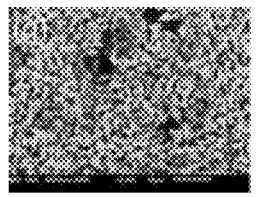 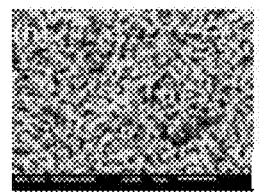
*FIG. 7E*  *FIG. 7F*  *FIG. 7G*  *FIG. 7H*

POROUS GARNET RIBBON BY REACTION SINTERING METHOD

This application claims the benefit of priority under 35 U.S.C. § 119 of U.S. Provisional Application Ser. No. 63/273,374 filed on Oct. 29, 2021, the content of which is relied upon and incorporated herein by reference in its entirety.

Solid-state lithium-ion batteries (LIB) are emerging as the next-generation energy storage technology due to higher volumetric energy density, design efficiency and safety. Among several solid-state electrolytes, garnet (LLZO: $Li_7La_3Zr_2O_{12}$) type electrolyte is one of the most promising candidates for constructing Li-ion solid state batteries due to its high Li-ion conductivity in cubic phase at room temperature and high energy density in the form of thin ceramic membranes.

Lithium metal dendrite formation and penetration through the thin ceramic ribbons of the electrolyte remains as one of the major obstacles in incorporating garnet in solid state LIBs. Another critical challenge in the applications of garnet in LIBs is the significant volume change of Li metal anode upon plating and stripping that can result in the formation of voids at the interface between the lithium and the separator during cell cycling.

SUMMARY

Recently, it has been shown that a three-dimensional structure that consists of a porous garnet layer on the top of a thin dense layer of garnet electrolyte, well sintered at the interface, can potentially mitigate the effects of unstable anode volume and inhibit Li-dendrite growth. In this porous-dense bilayer architecture of garnet tapes/ribbons, the porous network of garnet on the dense electrolyte can not only provide a continuously conductive route for Li+ ion movement but the provides space for and constrains the lithium so that the cell dimensions do not substantially change as a result of the changes on the anode during plating and striping. Moreover, the porous garnet layer provides a larger area of contact between Li metal and the garnet electrolyte that reduces the local current density at the interface under an applied areal current density and prevents Li dendrite formation inside garnet. The disclosure therefore generally relates to garnet electrolyte membranes prepared by tape casting process that can be used in Li-ion solid state battery technologies.

DESCRIPTION OF THE DRAWINGS

The drawings illustrate generally, by way of example, but not by way of limitation, various embodiments discussed herein.

(FIGS. 2A and 2E), 1225° C. (FIGS. 2B and 2F), 1250° C. (FIGS. 2C and 2G) and 1275° C. (FIGS. 2D and 2H). FIGS. 2A-2D are the backscattered electron images of the ribbons.

(FIGS. 3A and 3E); 1200° C. (FIGS. 3B and 3F); 1225° C. (FIGS. 3C and 3G); and 1250° C. (FIGS. 3D and 3H).

FIGS. 6A-6C are x-ray tomography images for porous green ribbons made by vibratory milling all the slip components (FIG. 6A), method 1 described herein (FIG. 6B), and method 2 (FIG. 6C) in Example 5 herein.

FIGS. 7A-7H are SEM images of porous sintered ribbons made from slip method 1 described herein and fast fired at 1200° C. (FIGS. 7A and 7E), 1225° C. (FIGS. 7B and 7F), 1250° C. (FIGS. 7C and 7G), and 1275° C. (FIGS. 7D and 7H). FIGS. 7E-7H are the backscattered electron images of the ribbons.

(FIGS. 8A and 8E), 1225° C. (FIGS. 8B and 8F), 1250° C. (FIGS. 8C and 8G), and 1275° C. (FIGS. 8D and 8H). FIGS. 8E-8H are the backscattered electron images of the ribbons.

DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Known methods for making porous garnet membranes include using poly (methyl methacrylate) (PMMA) as a pore-forming material in green garnet ribbons to prepare a porous garnet layer by mixing the pore formers in the tape casting slip before deaeration. The porous and dense ribbons can then be laminated by hot-pressing, followed by sintering at 1100° C. for 6 hours to form a bilayer structure. The fugitive pore formers can then be removed by combustion during the sintering process and leaves voids behind in the fired ribbon. The methods described herein, however, are methods for making porous garnet membrane from the precursor materials by reaction sintering and without using any pore-forming reagents in the tape casted slip composition. The methods described herein, for example, demonstrate that reaction sintering between the precursors to form garnet can be achieved by, among other methods, a fast-firing technique. And while some believe that the size of the pore former (e.g., PMMA spheres) controls the pore size in the garnet membrane, the methods described herein show that the size of precursor materials, e.g., $Li_2CO_3$ particle used to make the green ribbons, can vary the pore size in these structures. Moreover, methods that use, e.g., PMMA only allow organic solvent-based tape casting slip systems whereas the methods described herein enable aqueous tape-casting formulations and the use of other pore-forming materials and are generally safer and more environmentally friendly.

As used herein, the term "LLZO," "garnet," or like terms refer to compounds including lithium (Li), lanthanum (La), zirconium (Zr), and oxygen (O) elements. Optionally, dopant elements may substitute at least one of Li, La, or Zr. For example, a lithium-garnet electrolyte can comprise at least one of: (i) $Li_{7-3a}La_3Zr_2L_aO_{12}$, with L=Al, Ga or Fe and $0<a<0.33$; (ii) $Li_7La_{3-b}Zr_2M_bO_{12}$, with M=Bi, Ca, or Y and $0<b<1$; (iii) $Li_{7-c}La_3(Zr_{2-c}N_c)O_{12}$, with N=In, Si, Ge, Sn, V, W, Te, Nb, or Ta and $0<c<1$; (iv) $Li_{7-x}La_3(Zr_{2-x}, M_x)O_{12}$, with M=In, Si, Ge, Sn, Sb, Sc, Ti, Hf, V, W, Te, Nb, Ta, Al, Ga, Fe, Bi, Y, Mg, Ca, or combinations thereof and $0<x<1$, or a combination thereof.

Figure 1:
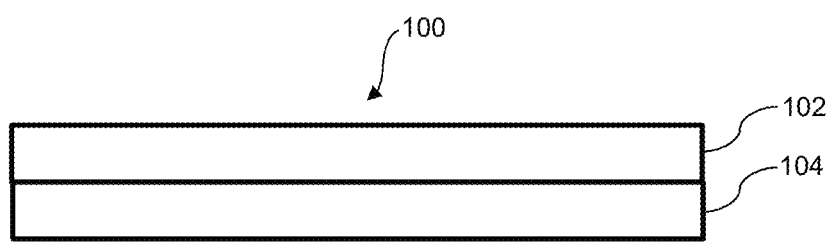
FIG. 1 is a porous garnet ribbon as described in the disclosure.
Figure 2A:
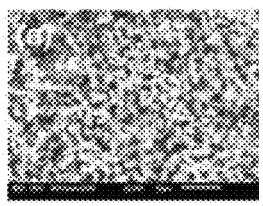
FIGS. 2A-2H is scanning electron microscope (SEM) images for porous tapes of 0.5Ta-doped LLZO made by reaction sintering. The tapes were fast fired at 1200° C.
Figure 2B:
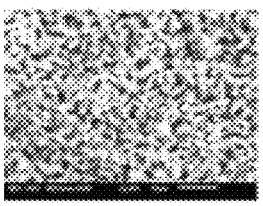
Figure 2C:
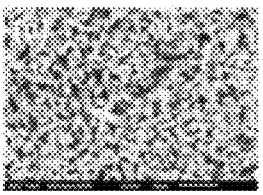
Figure 2D:
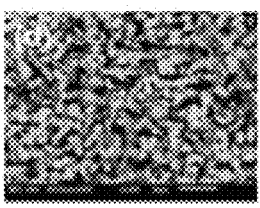
Figure 2E:
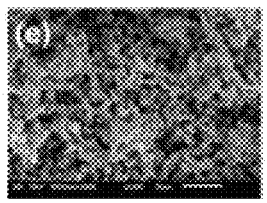
Figure 2F:
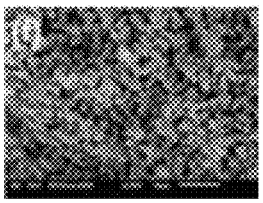
Figure 2G:
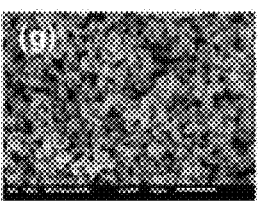
Figure 2H:
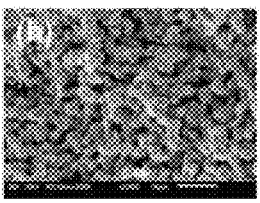
Figure 3A:
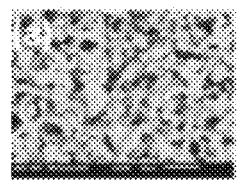
FIGS. 3A-3H is SEM images for porous ribbons of 0.15Al-doped LLZO made by reactive sintering from aqueous slip composition (FIGS. 3A-3D), and organic slip (FIGS. 3E-3H) by fast firing at 1175° C.
Figure 3B:
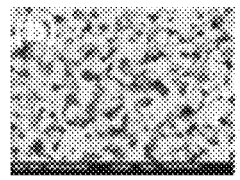
Figure 3C:
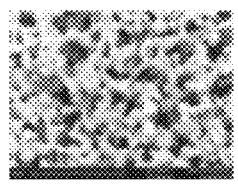
Figure 3D:
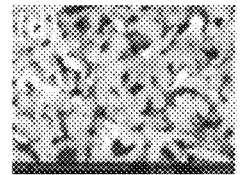
Figure 3E:
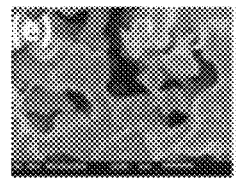
Figure 3F:
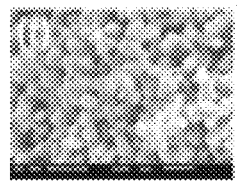
Figure 3G:
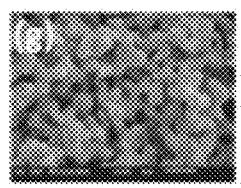
Figure 3H:
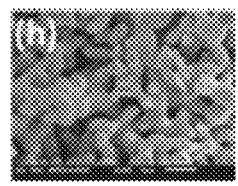

Making reference to FIG. 1, the disclosure generally relates to a 100 ribbon comprising an open-pore lithium-ion conducting ceramic layer 102 having a porosity of from about 50% to about 90% and a $d_{90}$ pore size of less than about 10 μm (e.g., less than about 8 μm, less than about 5 μm, less than 3 μm, less than 1 μm, from about 0.5 μm to about 10 μm, about 1 μm to about 5 μm, 0.1 μm to about 10 μm or about 2 μm to about 8 μm) and the thickness of the open-pore lithium-ion conducting ceramic layer is between about half the $d_{90}$ and about 70 μm. The ribbon shown in FIG. 1 is an example of a ribbon that further comprises a closed-pore lithium-ion conducting ceramic layer 104 comprising substantially no pores/porosity and having a thickness of from about the median size of the pores in the open-pore lithium-ion conducting ceramic layer and 30 μm. Even though the open-pore lithium-ion conducting ceramic layer 102 and the closed-pore lithium-ion conducting ceramic layer 104 are shown as having the same thickness, it should be understood that each layer can have a different thickness as prescribed herein (e.g., a thickness of the open-pore lithium-ion conducting ceramic layer between about half the $d_{90}$ and about 70 μm; and a thickness of the closed-pore lithium-ion conducting ceramic layer of from about the median size of the pores of the open-pore lithium-ion conducting ceramic layer and 30 μm).

The closed-pore lithium-ion conducting ceramic layer and the open-pore lithium-ion conducting ceramic layer can have substantially the same chemical composition. Alternatively, the closed-pore lithium-ion conducting ceramic layer and the open-pore lithium-ion conducting ceramic layer have substantially a different chemical composition. For example, the close-pore region 104 can be another lithium ion conductor than garnet such as lithium phosphorous oxynitride. The ribbon can have an open-pore lithium-ion conducting ceramic layer having a db of less than 1, wherein the db is equal to $(d_{90}-d_{10})/d_{50}$. The "d" values described herein are a quantification of the pore size distribution. The term "$d_{50}$," as used herein refers, to the 50th percentile number- or volume-based median pore diameter, which is the diameter below which 50% by number or volume of the pore size population is found. Other percentages such as $d_{10}$ (10%) and $d_{90}$ (90%) are also commonly used. The term "$d_{90}$," as used herein, refers to the 90th percentile of either a number- or volume-based median pore diameter, which is the diameter below which 90% by number of volume of the pore size population is found.

The disclosure also generally relates to a ceramic ribbon comprising sintered LLZO having at least about 50% (e.g., at least 55%), at least about 55% or at least about 60% porosity and at least about 65 wt. % of a cubic garnet phase. The porosity of the ceramic ribbon can be, e.g., from about 50% to about 70% as measured by mercury porosimetry analysis ASTM method D4404-18. Sometimes, however, the porosity of the ceramic ribbon can be measured using scanning electron microscopy (SEM) by using a cross-section of the ribbon. The thickness of the ribbon can be measured similarly, by SEM of a cross-section of the ribbon. In addition, or alternatively, the ribbon comprises at least about 75 wt. %, at least about 80 wt. % or at least about 85 wt. %, from about 65 wt. % to about 90 wt. %, about 65 wt. % to about 95 wt. %, about 75 wt. % to about 95 wt. % or about 80 wt. % to about 90 wt. % of a cubic garnet phase.

As described herein, the ceramic ribbon can be doped. The LLZO can be doped with one or more elements, such that the LLZO includes one or more elements that replace or supplement one or more of Li, La, Zr, or O in the base formula $Li_7La_3Zr_2O_{12}$. Thus for example, one or more of Li, La, Zr, or O is replaced or supplemented with one or more doped elements, such as Al, Ga, Ta, Nb, W, Ca, or a combination thereof. The LLZO can be doped with Ta. The LLZO doped with Ta can have the composition $Li_{6.7-6.3}La_3Zr_{1.5}Ta_{0.3-0.7}O_{12}$, $Li_{6.5}La_3Zr_{1.5}Ta_{0.3-0.7}O_{12}$ or $Li_{6.7}La_3Zr_{1.7}Ta_{0.15}Nb_{0.15}O$, also described herein as "0.15 Ta LLZO," or $Li_{6.5}La_3Zr_{1.5}Ta_{0.5}O_{12}$, also described herein as "0.5 Ta LLZO." Alternatively, LLZO can be doped with Al. The LLZO doped with Al can have the composition $Li_{6.25}Al_{0.25}La_3Zr_2O_{12}$ or $Li_{6.55}Al_{0.15}La_3Zr_2O_{12}$, also described herein as "0.15 Al LLZO."

The ceramic ribbons described herein, and made by the methods described herein, are porous. The pore size can be, e.g., at least about 0.1 μm, at least 0.5 μm, at least about 1 μm, at least about 1.5 μm, at least about 2 μm, about 0.1 μm to about 3 μm, about 0.5 μm to about 2 μm, about 1 μm to about 3 μm or about 0.5 μm to about 3 μm, the pore size being measured by mercury porosimetry analysis ASTM method D4404-18.

The ceramic ribbons described herein, and made by the methods described herein, can have a conductivity of at least about $10^{-3}$ siemens per centimeter (S/cm), at least about $10^{-4}$ S/cm, at least about $10^{-5}$ S/cm or from about $10^{-3}$ to about $10^{-5}$ S/cm at room temperature (e.g., 25° C.). The ceramic ribbons can, e.g., have a lithium ion conductivity, such as a lithium ion conductivity of from about $1\times10^{-3}$ S/cm to about $1\times10^{-5}$ S/cm at room temperature, from $1\times10^{-4}$ S/cm to about $9\times10^{-4}$ S/cm at room temperature, or less than or equal to about $1\times10^{-5}$ S/cm at room temperature but greater than or equal to about $1\times10^{-3}$ S/cm at room temperature, about $2\times10^{-3}$, about $4\times10^{-3}$, about $6\times10^{-3}$, about $8\times10^{-3}$, 1 about$\times10^{-4}$, about $2\times10^{-4}$, about $4\times10^{-4}$, about $6\times10^{-4}$, or about $8\times10^{-4}$ S/cm at room temperature. The conductivity, also referred to herein as the lithium-ion conductivity measurement, can be performed on samples of the ribbons described herein using electronic impedance spectroscopy (EIS) by using Solartron SI 1287 instrument with an AC current frequency scanning from $10^6$-1 Hz at an amplitude of 20 mV. Au blocking electrodes were applied on both sides of the samples by sputtering before the measurement.

The disclosure provides a ribbon casting powder or tape casted slip composition comprising LLZO precursors $Li_2CO_3$, lanthanum compound (e.g., $La(OH)_3$, $La_2(CO_3)_3$ or $La_2O_3$), $ZrO_2$, and, when doped, $Ta_2O_5$ or $Al_2O_3$ as a source of the Ta or Al dopant. The tape casting powder or tape casted slip composition can be used to prepare a green ribbon or dried product thereof that is formed by tape casting of a composition comprising LLZO precursors $Li_2CO_3$, lanthanum compound (e.g., $La(OH)_3$ or $La_2O_3$), $ZrO_2$, and, when doped, $Ta_2O_5$ or $Al_2O_3$ as a source of the Ta or Al dopant. The tape casting powder or tape casted slip composition can further include sufficient excess lithium source such that the tape casting powder has a total amount of Li that is 1% to 40% in excess of a stoichiometric amount of Li in the LLZO. The excess lithium source can include $Li_2CO_3$, LiOH, $Li_2O$, LiCl, $LiNO_3$, Li-citrate, Li-acetate, Li-oleate, LiF, $Li_2SO_4$, or combinations thereof. In some examples, the ribbon casting powder or tape casted slip composition comprising LLZO precursors comprises lithium, wherein greater than 50% of the lithium in the composition powder or tape casted slip composition is in the form of lithium carbonate.

$Li_2CO_3$ melts at 723° C., followed by its decomposition into $Li_2O$ and $CO_2$. The melting of $Li_2CO_3$ can provide a liquid phase to enhance garnet sintering. With more $Li_2CO_3$ in the powder system, the liquid phase can last to higher temperature during calcination. With faster temperature ramping rate, $Li_2CO_3$ can also be kept in liquid phase to higher temperatures. The $Li_2CO_3$ liquid phases can significantly enhance the garnet sintering during the method of tape casting.

The tape casted slip composition can further include any suitable one or more components, such as excess lithium source, a dispersant, a plasticizer, a solvent, a binder, a defoamer or a combination thereof.

The tape casted slip composition can include a dispersant. The dispersant can be any suitable dispersant. The dispersant can be a water-soluble linear polymer that includes one or more polar groups thereon. The dispersant can include DS001, DS-002, DS004, DS005, and DS009, all of which are available from Polymer Innovations, Inc.; Disperbyk® 118, Disperbyk® 142, Disperbyk® 182, Disperbyk® 2022, Disperbyk® 2155, Solsperse™ 41090, Anti-Terra® 250, fish oil, or combinations thereof. The dispersant can form any suitable proportion of the tape casting composition. For example, the dispersant can be 0.1 wt %-10 wt % of the tape casted slip composition, 0.5 wt % to 5 wt %, or less than or equal to 10 wt % and greater than or equal to 0.1 wt %, 0.5, 1, 2, 3, 4, 5, 6, 7, 8, or 9 wt % of the tape casted slip composition.

The tape casted slip composition can include a plasticizer. The plasticizer can be any suitable plasticizer. The plasticizer can include n-butyl stearate, Polymer Innovations® PL029, dibutyl phthalate (DBP), propylene glycol (PG), Hypermer KD-1 polyamine-polyester mixture, or a combination thereof. The plasticizer can form any suitable proportion of the tape casted slip composition, such as 0.1 wt %-10 wt % of the tape casted slip composition, 0.5 wt % to 5 wt %, or less than or equal to 10 wt % and greater than or equal to 0.1 wt %, 0.5, 1, 2, 3, 4, 5, 6, 7, 8, or 9 wt % of the tape casted slip composition.

The tape casted slip composition can include a solvent, such as water, an organic solvent or combinations thereof. The solvent can include n-propyl propionate. The solvent can form any suitable proportion of the tape casted slip composition. For example, the solvent can be 10 wt % to 80 wt % of the tape casted slip composition, 30 wt % to 50 wt %, or less than or equal to 80 wt % and greater than or equal to 10 wt %, 15, 20, 25, 30, 35, 40, 45, 50, 55, 60, 65, 70, or 75 wt % of the tape casted slip composition.

The tape casted slip composition can include a binder. The binder can be any suitable binder. The binder can include an iso-butyl/n-butyl methacrylate copolymer. The binder can include a polyvinyl butyral-based binder or an acrylic binder. Examples of binders include WB4101 water based binder, available from Polymer Innovations, Inc.; Elvacite® 2046, Elvacite® 4044, Butvar® B-79, or combinations thereof. The binder can form any suitable proportion of the tape casted slip composition. For example, the binder can be 1 wt % to 20 wt % of the tape casted slip composition, or 5 wt % to 15 wt %, or less than or equal to 20 wt % and greater than or equal to 1 wt %, 2, 4, 6, 8, 10, 12, 14, 16, 18, or 19 wt % of the tape casted slip composition.

The green ribbon or dried product thereof formed by tape casting of the compositions described herein (e.g., a tape casted slip composition comprising $Li_2CO_3$, lanthanum compound (e.g., $La(OH)_3$, $La_2(CO_3)_3$ or $La_2O_3$), $ZrO_2$ and at least one of a dispersant, solvent, plasticizer, binder, defoamer, and substantially no pore forming agent, such as less than 5% of an organic pore former) can be flexible and can retainer such flexibility for at least 1 month (e.g., at least 1 month, 2 months, 3, 4, 5, 6, 7, 8, 10 months, 1 year, 1.5, 2, 3, 4, or 5 years or more) after the formation of the green ribbon or dried product thereof.

The green ribbon or dried product thereof can have any suitable thickness, such as a thickness of 25 microns to 150 microns, 40 microns to 130 microns, or less than or equal to 150 microns but greater than or equal to 25 microns, 30, 35, 40, 45, 50, 55, 60, 65, 70, 75, 80, 85, 90, 95, 100, 105, 110, 115, 120, 125, 130, 135, 140, or 145 microns.

The disclosure also provides a method of making a ceramic ribbon, the method comprising sintering (e.g., reaction sintering) a tape casted slip composition comprising $Li_2CO_3$, lanthanum compound (e.g., $La(OH)_3$ or $La_2O_3$), $ZrO_2$ and at least one of a dispersant, solvent, plasticizer, binder, defoamer, and substantially no pore forming agent, such as less than 5% of an organic pore former, at a temperature of at least about 600° C. to give sintered LLZO. The tape casted slip composition can comprise, for example, $Li_2CO_3$, lanthanum compound (e.g., $La(OH)_3$ or $La_2O_3$), $ZrO_2$ and a dispersant, a solvent, a plasticizer, a binder, and substantially no pore forming agent, such as less than 5% of an organic pore former. Alternatively, the tape casted slip composition can comprise, for example, $Li_2CO_3$, lanthanum compound (e.g., $La(OH)_3$ or $La_2O_3$), $ZrO_2$ and a dispersant, a solvent, a binder, a defoamer, and substantially no pore forming agent, such as less than 5% of an organic pore former. The tape casted slip compositions described herein can comprise other additional components, including stabilizers such as ammonium hydroxide ($NH_4OH$). A cubic garnet phase begins to form at approximately at 600° C. for 0.5 Ta LLZO; and approximately 900° C. for 0.15 Al LLZO. Accordingly, the sintering of the tape casted slip composition is at a temperature of at least about 600° C., at least about 700° C., at least about 800° C., at least about 900° C., at least about 1000° C., at least about 1100° C., at least about 1200° C., at least about 1300° C., from about 600° C. to about 1300° C., from about 600° C. to about 1100° C. or from about 600° C. to about 1200° C. The sintering of the tape casted slip composition causes the formation of a cubic garnet phase in the ceramic ribbons made by the methods described herein. Thus, for example, sintering of the tape casted slip compositions described herein causes the resulting ribbons to comprise at least about 75 wt. %, at least about 80 wt. % or at least about 85 wt. %, from about 65 wt. % to about 90 wt. %, about 65 wt. % to about 95 wt. %, about 75 wt. % to about 95 wt. % or about 80 wt. % to about 90 wt. % of a cubic garnet phase.

While not wishing to be bound by any specific theory, it is believed that a target pore size of the ribbons described herein can be tuned based on the particle size of, e.g., $Li_2CO_3$ and $La(OH)_3$ or other carbonates/hydrates (e.g., $Ca(OH)_2$ or $CaCO_3$) used in the tape casted slip compositions. Accordingly, larger or smaller pores can be tuned by using larger or smaller carbonate/hydrate particles. In some instances, where even greater porosity is desired, more porosity can be generated by adding pore former particles (e.g., poly (methyl methacrylate) (PMMA) particles) that are substantially the same size as the pores that would be formed during the reaction sintering process from a particular set of raw material particle sizes. Choosing the pore former particle size in this manner can result in the narrowest possible pore size distribution of the targeted pore size.

The methods described herein include preparing the tape casted slip composition. For example, the preparation of the tape casted slip composition can include first batching $Li_2CO_3$, lanthanum compound (e.g., $La(OH)_3$ or $La_2O_3$), and $ZrO_2$ and milling the resulting mixture by any suitable means (e.g., jet milling or vibratory milling) to a suitable particle size. A suitable particle size is a D50 of about 0.5 μm prior to preparing the tape casted slip composition. Alternatively, the $Li_2CO_3$, lanthanum compound (e.g., $La(OH)_3$ or $La_2O_3$), and $ZrO_2$ can first be batched and mixed to give a mixed composition prior to preparing the tape casted slip composition. The mixing includes batching stochiometric amounts of $Li_2CO_3$, lanthanum compound (e.g., $La(OH)_3$ or $La_2O_3$), and $ZrO_2$ and mixing (e.g., using a tubular mixer). Small portions of water can then added to the batched powder. The addition of water to the batched powder can cause an exotherm that can come from the hydration of the lanthanum compound. The batched powder, now comprising water, can then be mixed (e.g., using an planetary mixer, such as a Mazerustar® planetary mixer) until the mixture becomes smooth paste-like or any chemical reaction takes place (e.g., indicated by the increase in the temperature of the mixture). The wet paste can then dried overnight at 90° C., followed by grinding using mortal-pestle to a fine powder.

Regardless of how a tape casted slip composition is prepared (e.g., first batching $Li_2CO_3$, lanthanum compound (e.g., $La(OH)_3$ or $La_2O_3$), and $ZrO_2$ and milling (e.g., jet milling) the resulting mixture the resulting powders can then be combined with at least one of a dispersant, solvent, plasticizer, binder, defoamer, and substantially no pore forming agent. When the casting slip composition is prepared using an organic solvent, then the tape casted slip composition is an organic tape casted slip composition. When the casting slip composition is prepared using water, then the tape casted slip composition is an aqueous tape casted slip composition.

The tape casted slip compositions described herein can be tape cast to form a green ribbon or dried product thereof. The tape casting method can include tape casting the tape casted slip compositions described herein on a suitable substrate, such as a silicon-coated carrier film (e.g., a silicon-coated mylar carrier film), using any suitable method, such as a doctor blade method, dip coating, spin coating, slot-die coating, and bar coating. The resulting tape cast green ribbon and/or dried product thereof, as well as the ribbons described herein, can have any suitable thickness (e.g., a thickness that does not include the substrate), such as a thickness of 25 μm to 150 μm, 40 μm to 130 μm, or less than or equal to 150 μm but greater than or equal to 25 μm, 30, 35, 40, 45, 50, 55, 60, 65, 70, 75, 80, 85, 90, 95, 100, 105, 110, 115, 120, 125, 130, 135, 140, or 145 μm. Alternatively, or in addition, the resulting tape cast green ribbon and/or dried product thereof, as well as the ribbons described herein, can have any suitable width, such as a width of 1 cm to 100 cm, 1 cm to 50 cm, or less than or equal to 100 cm but greater than or equal to 5, 10, 15, 20, 25, 35, 55, 75, 85, or 95 cm. Alternatively, or in addition, the resulting tape cast green ribbon and/or dried product thereof, as well as the ribbons described herein, can have any suitable length, such as a length of 10 cm to 100 m, 10 cm to 1 m, or less than or equal to 100 m but greater than or equal to 1 m, 2, 3, 5, 10, 15, 20, 30, 50, or 75 m.

The methods described herein can further include sintering the green ribbon to form a LLZO ribbon. The sintering process can be any suitable sintering method. The sintering process can include fast firing or conventional sintering. The fast firing can be performed in air or in inert gas. The sintering process can be fast firing in air. The fast-firing sintering can be performed for no longer than 20 minutes (e.g., no longer than 20 minutes, 19, 18, 17, 16, 15, 14, 13, 12, 11, 10, 9, 8, 7, 6, 5, 4, 3, 2, or 1 minute). The method can be free of additional heating after the sintering.

The sintering process can include heating to 1000° C. to 1400° C. (e.g., 1100° C. to 1300° C., 1150° C. to 1250° C., or less than or equal to 1400° C. but greater than or equal to 1000° C., 1020, 1040, 1060, 1080, 1100, 1120, 1140, 1160, 1180, 1200, 1220, 1240, 1250, 1260, 1280, 1300, 1320, 1340, 1360, or 1380° C.) for any suitable duration (e.g., 0.5 min to 7 days, or 0.5 min to 30 min, or less than or equal to 7 days but greater than or equal to 0.5 min, 1, 2, 4, 6, 8, 10, 15, 20, 25, 30, 35, 40, 45, 50, 55 minutes, 1 h, 1.5, 2, 4, 6, 8, 10, 12, 14, 16, 18, 20, 22 h, 1 d, 1.5, 2, 3, 4, 5, or 6 d) using any suitable temperature ramp up (e.g., 100° C./min to 1000° C./min, 200° C./min to 600° C./min, or less than or equal to 1000° C./min but greater than or equal to 100° C./min, 150, 200, 250, 300, 350, 400, 450, 500, 550, 600, 650, 700, 750, 800, 850, 900, or 950° C./min). The sintering includes heating to 1000° C. to 1400° C. using a temperature ramp up of 100° C./min to 1000° C./min for 0.5 min to 7 days. The sintering process can include heating to 1000° C. to 1400° C. using a temperature ramp up of 100° C./min to 1000° C./min for 0.5 min to 30 min. The sintering process can include heating to 1100° C. to 1300° C. using a temperature ramp up of 100° C./min to 1000° C./min for 1 min to 20 min. The method can include forming the LLZO ribbon by hot pressing. A two-pass sintering process is also contemplated herein. The second sintering pass could be useful in removing, among other substances, water coming from the raw materials at lower temperature prior to the high temperature firing step. For example, removal of water in a second sintering pass can reduce lithium loss during firing.

The methods described herein can further include performing a binder burnout prior to the sintering. The binder burnout can be any suitable procedure that removes the binder from the green ribbon. For example, the binder burnout can include heating the green ribbon in an inert gas or in air to a temperature of 400° C. to 800° C. for a sufficient time to substantially remove binder.

The LLZO film that results from the sintering process can have any suitable thickness; for example, the LLZO film can have a thickness of 25 μm to 125 μm, 40 μm to 100 μm, or less than or equal to 125 μm but greater than or equal to 25, 30, 35, 40, 45, 50, 55, 60, 65, 70, 75, 80, 85, 90, 95, 100, 105, 110, 115, or 120 μm.

The disclosure also relates to articles comprising the ceramic ribbons described herein, such as the ceramic ribbons comprising sintered LLZO having at least about 50% (e.g., at least 55%), at least about 55% or at least about 60% porosity and at least about 65 wt. % of a cubic garnet phase, such as ceramic ribbons made by the methods described herein. Such articles include electronic articles, including batteries and the like.

Values expressed in a range format should be interpreted in a flexible manner to include not only the numerical values explicitly recited as the limits of the range, but also to include all the individual numerical values or sub-ranges encompassed within that range as if each numerical value and sub-range were explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "substantially no" as used herein refers to less than about 30%, 25%, 20%, 15%, 10%, 5%, 3%, 2%, 1%, 0.5%, 0.1%, 0.05%, 0.001%, or at less than about 0.0005% or less or about 0% or 0%.

EXAMPLES

It is understood that the examples and embodiments described herein are for illustrative purposes only and that various modifications or changes in light thereof will be suggested to one skilled in the art without departing from the scope of the present disclosure.

Example 1: Preparation of Garnet Precursor Powder

Porous garnet layers of 0.5Ta-LLZO and 0.15Al-LLZO compositions can be made using reaction sintering of precursor materials $Li_2CO_3$, lanthanum compound (e.g., $La(OH)_3$ or $La_2O_3$), $ZrO_2$ and $Ta_2O_5$ or $Al_2O_3$ as a source of the Ta or Al-dopant.

$La_2O_3$ powder was thermally treated at 950° C. for 2 h under $N_2$ atmosphere to remove the residual water from the powder. The mixture of powders was treated in two ways. The first way includes batching stochiometric amounts of the precursors, jet milling the batched precursors to a particle size of D50=0.5-0.6 μm and directly using the resulting powder in a slip. Alternatively, a second way includes batching stochiometric amounts of precursors and mixing the resulting powder using a tubular mixer for 20 minutes. Small portions of water were then added to the powder and carefully mixed using a Mazerustar® planetary mixer until the mixture becomes smooth and paste-like or any chemical reaction takes place (e.g., indicated by the increase in the temperature of the mixture). The wet paste was then dried overnight at 90° C., followed by grinding using mortal-pestle to a fine powder.

Example 2: Preparation of a Green Ribbon by Tape Casting of Slips

The following slip compositions for making porous 0.5Ta-LLZO and 0.15Al-LLZO ribbons were used using the respective precursors (e.g., $Li_2CO_3$, lanthanum compound (e.g., $La(OH)_3$ or $La_2O_3$), $ZrO_2$ and $Ta_2O_5$ or $Al_2O_3$) in the slip.

TABLE 1

Slip compositions for the porous 0.5Ta-LLZO ribbon

| Components | Name | Weight (gm) |
| --- | --- | --- |
| Solids | 0.5Ta-LLZO precursors-jetmilled | 50.00 |
| Dispersant | Disperbyk-118 | 1.56 |
| Solvent | n-Butyl propionate | 35.20 |
| Plasticizer | Dibutyl phthalate | 2.82 |
| Binder | Elvacite 2046 | 6.30 |

TABLE 2

Slip compositions for the porous 0.15Al-LLZO ribbon (organic slip)

| Components | Name | Weight (gm) |
| --- | --- | --- |
| Solids | 0.15Ta-LLZO precursors-with added water are mixed | 50.00 |
| Dispersant | Disperbyk-118 | 2.35 |
| Solvent | n-Butyl propionate | 53.50 |
| Plasticizer | Dibutyl phthalate | 4.27 |
| Binder | Elvacite 2046 | 9.57 |

TABLE 3

Slip compositions for the porous 0.15Al-LLZO ribbon (aqueous slip)

| Components | Name | Weight (gm) |
| --- | --- | --- |
| Solids | 0.15Ta-LLZO precursors-with added water are mixed | 50.00 |
| Dispersant | DS-001 | 0.975 |
| Solvent | Water | 83 |
| Defoamer | DF-002 | 0.18 |
| Binder | WB4101 | 15.44 |
| $NH_4OH$ | $NH_4OH$ | 1.02 |

Vibratory milling was used to make the slips described in Tables 1-3. First, the solid powders were added along with the dispersant in the solvent. The resulting mixture was milled overnight for mixing. The plasticizer and the binder were then added, and the slips were milled for ~4 hours. The slips were then degassed under vacuum using Mazerustar® planetary mixer, followed by casting on silicone coated mylar carrier film with doctor blades and allowed to dry overnight in air.

Example 3: Fast Firing Technique to Make Porous Ribbon by Reaction Sintering

The green ribbons described in Example 2 were cut into 1" diameter disk and arranged on a graphoil sheet. The ribbons were first put through a binder burn-out process under argon atmosphere using the following steps to remove the organics. The burn-out process includes:

i. Ramp up to 420° C. at 100° C./hr. Hold for 30 mins.

ii. Ramp up to 700° C. at 100° C./hr. Hold for 30 mins.

iii. Ramp down to 25° C. at 200° C./hr.

Immediately after the binder burn-out cycle, the ribbons were sintered using a fast firing technique in a sled furnace consisting of three hot zones with uniform heating. To prevent shape deformation of the ribbons while sintering, a piece of graphoil sheet and a cordierite substrate was placed on top of the ribbons. Typically, the ribbons were sintered under argon atmosphere at 1200° C., 1225° C., 1250° C., and 1275° C., followed by a post heat treatment at 1000° C. in dry N2 and O2 flow. We fast fired the ribbons at a feed rate of 4.4 inches per minute through the sled furnace. All the fired ribbons were vacuum sealed after the post heat treatments till their analysis.

Example 4: Measure Garnet Phase Content and Porosity of Ribbons

The garnet phase content of the ribbons described in Example 3 was performed using mercury porosimetry analysis. The cubic garnet phase content of the ribbons described in Example 3 was performed using X-ray diffraction. Table 4, herein, describes the cubic garnet phase content in the fast fired porous 0.5Ta-LLZO ribbons, whereas Table 5 describes the cubic garnet phase content in the fast fired porous 0.15Al-LLZO ribbons.

TABLE 4

Cubic garnet phase content in the fast fired porous 0.5Ta-LLZO ribbons

| Temperature (° C.) | Cubic garnet (%) | $La_2Zr_2O_7$(%) |
|---|---|---|
| 1200 | 88 | 11 |
| 1225 | 87 | 12 |
| 1250 | 87 | 12.5 |
| 1275 | 85 | 14 |

TABLE 5

Cubic garnet phase content in the fast fired porous 0.15Al-LLZO ribbons

| Temperature (° C.) | Cubic garnet (%) | | $La_2Zr_2O_7$(%) | |
|---|---|---|---|---|
| | Org. Slip | Aq. Slip | Org. Slip | Aq. Slip |
| 1175 | 89 | 86 | 8 | 8 |
| 1200 | 83 | 79 | 13 | 12 |
| 1225 | 82 | 87 | 14 | 9 |
| 1250 | 82 | 86 | 13 | 10 |

Figure 4A:
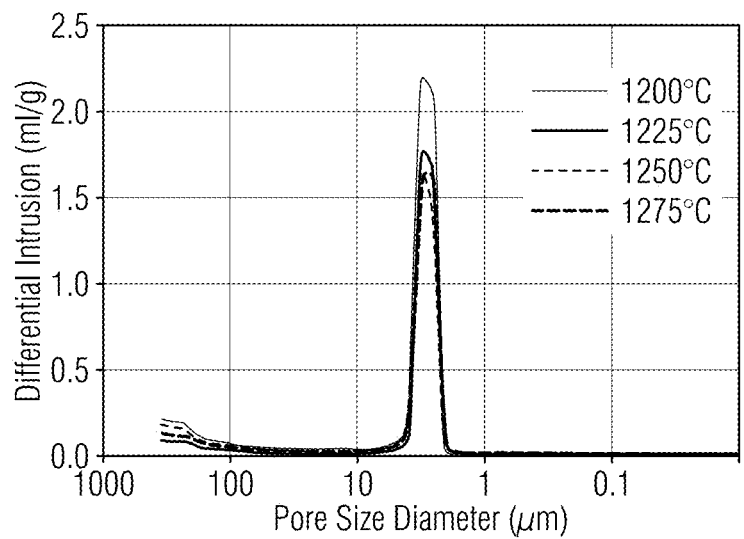
FIGS. 4A-4C are plots of differential mercury intrusion (mL/g) for porous ribbons of 0.5Ta-LLZO and 0.15Al-LLZO (FIG. 4A) from organic slip (FIG. 4B) and aqueous slip (FIG. 4C) made by reaction sintering during fast firing at 1175° C. (orange), 1200° C. (green), 1225° C. (blue), 1250° C. (red) and 1275° C. (purple).
Figure 4B:
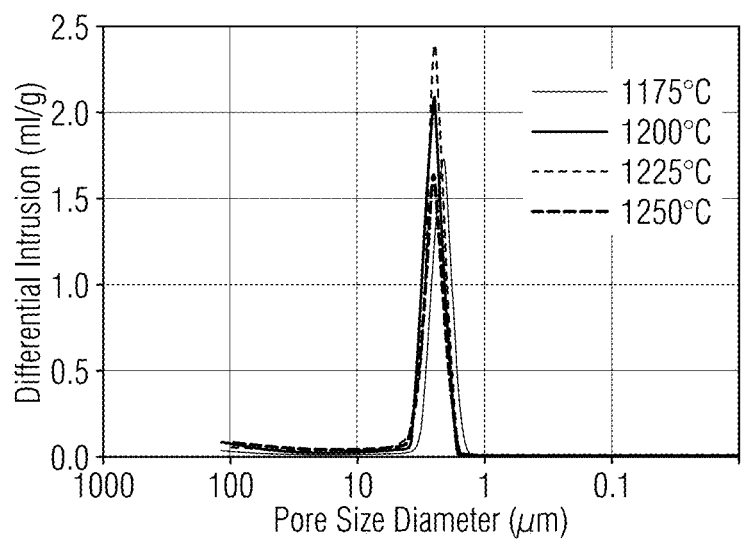
Figure 4C:
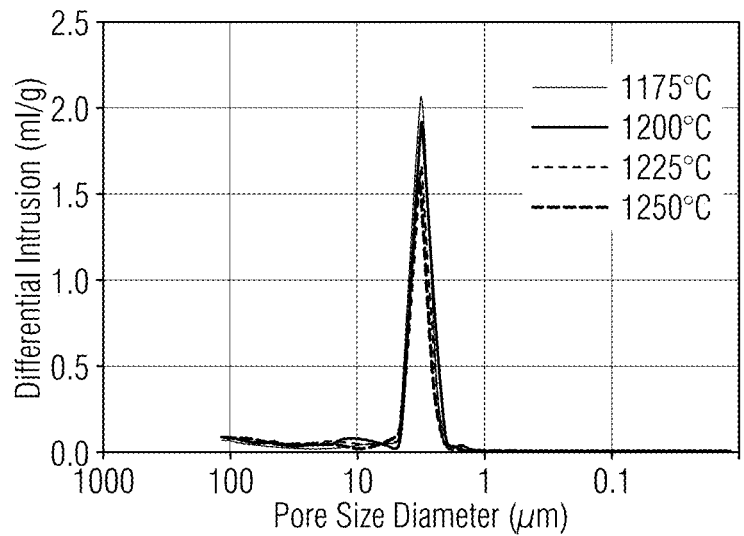
Figure 5A:
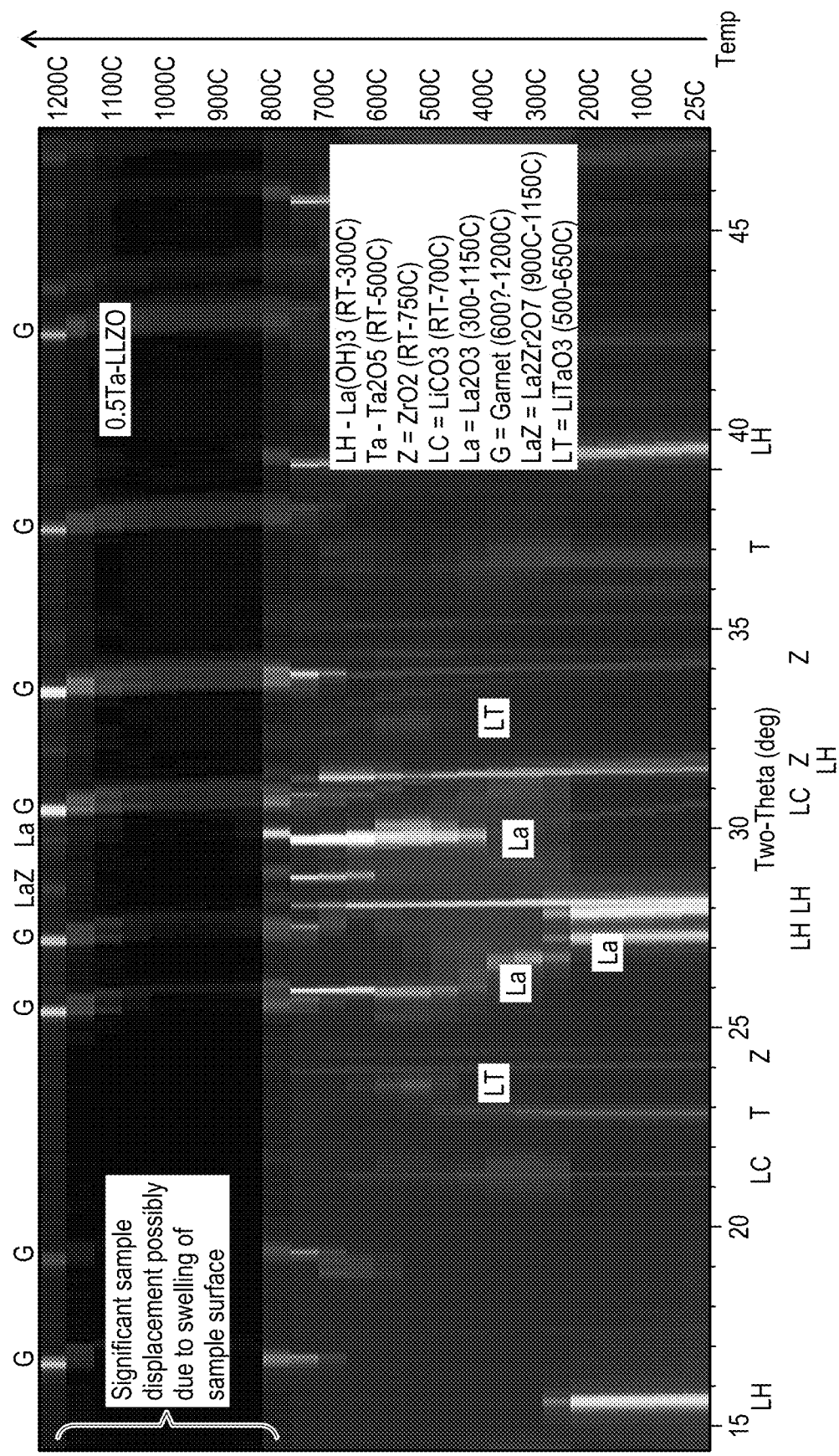
FIGS. 5A-5B are false color intensity from X-Ray diffraction for green 0.5Ta-LLZO (FIG. 5A) and 0.15Al-LLZO (FIG. 5B) ribbons as a function of temperature.
Figure 5B:
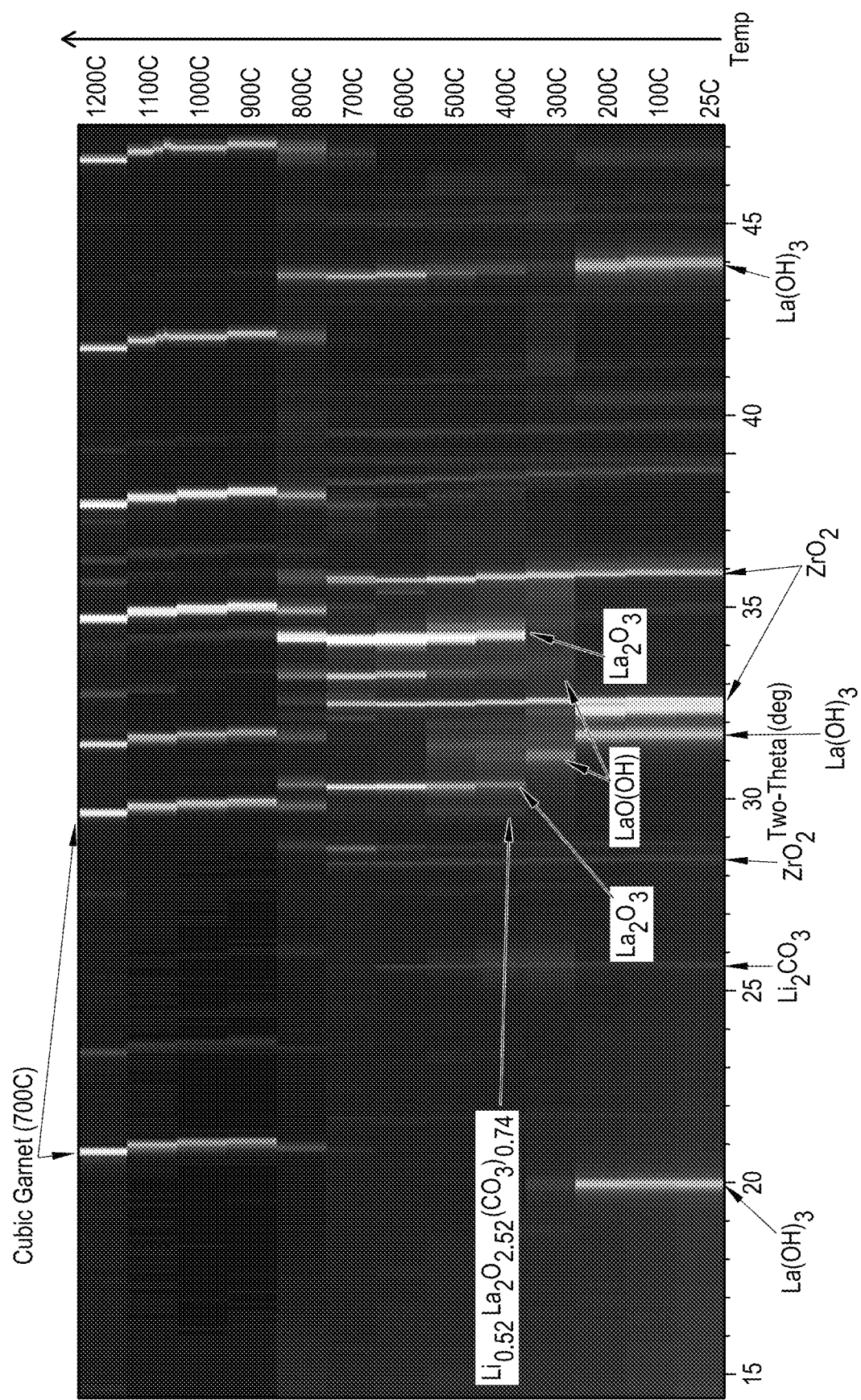

FIGS. 2A-2H is scanning electron microscope (SEM) images for porous ribbons of 0.5Ta-doped LLZO made by reaction sintering. FIGS. 3A-3H is SEM images for porous ribbons of 0.15Al-doped LLZO made by reactive sintering from aqueous and organic slips. FIGS. 4A-4C are plots of differential mercury intrusion (mL/g) for porous ribbons of (a) 0.5Ta-LLZO and 0.15Al-LLZO from (b) organic slip and (c) aqueous slip made by reaction sintering during fast firing at 1175° C. (orange), 1200° C. (green), 1225° C. (blue), 1250° C. (red) and 1275° C. (purple). FIGS. 5A-5B are high temperature X-Ray diffraction data on green (a) 0.5Ta-LLZO (b) 0.15Al-LLZO precursor powders.

Example 5: Pore Size Variation in Structure with Particle Size of Precursors $Li_2CO_3$ powder of a bigger particle size ($D_{50}$=19 μm, Spectrum) was used to make the green ribbon using the slip composition in Table 1 for 0.5Ta-LLZO. The remaining precursor materials lanthanum compound (e.g., $La(OH)_3$ or $La_2O_3$), $ZrO_2$ and $Ta_2O_5$ were mixed in stoichiometric amount and mixture was jet milled to a particle size of D50=0.5-0.6 μm. Two different processes were used to mix the $Li_2CO_3$ powder into the jet milled powder and making the slip.

Method 1. In this method, vibratory milling was used to mix the jet milled precursors with the dispersant in the solvent and the mixture was milled overnight for mixing. The plasticizer was then added along with the binder and the resulting slip was milled for ~4 hrs. Finally, the $Li_2CO_3$ powder was mixed in using a Mazerustar® planetary mixer at high speed.

Method 2. In this method, a Mazerustar® planetary mixer at high speed was used to mix all the components in the slip, followed by vibratory milling for 4 h to dissolve the binder.

The slips were then degassed under vacuum using Mazerustar® planetary mixer, followed by tape casting on silicone coated mylar carrier film with doctor blades and allowed to dry overnight. The green ribbons went through binder removal and fast firing process as discussed herein.

Figures 8A, 8B, 8C, 8D:
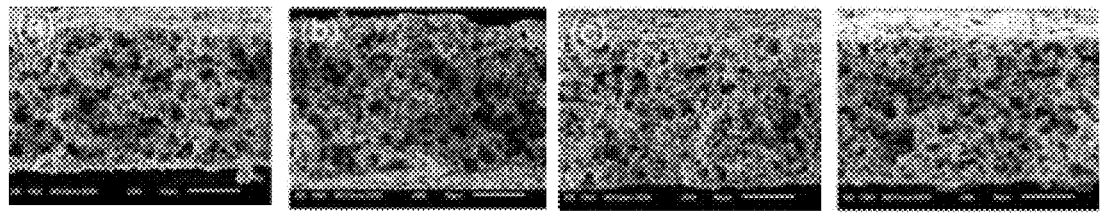
FIGS. 8A-8H are SEM images of porous fired ribbons made from slip method 2, and fast fired at 1200° C.
Figures 8E, 8F, 8G, 8H:

The average particle size of the Spectrum $Li_2CO_3$ ($D_{50}$=18.74 μm) is much larger than the particle size of the jet milled powders ($D_{50}$=0.5 μm) and the Mazerustar® planetary mixer is much gentler at mixing compared to vibratory milling. X-Ray tomography images of the various green ribbons shown in FIG. 6 reveals that the pore size (3D volume) decreases as the particle size of the $Li_2CO_3$ decreases and the mixing process becomes more vigorous. When all the precursors were jet milled and vibratory milling process was used to mix all the slip components, it created the most fine porous structure in the green ribbon as shown in FIG. 6A due to a high energy mixing of the smaller size particles that results in a homogenous distribution of the particles in the green ribbon. Further, the green ribbons prepared by method 1 and 2 had much larger pores but method 1 (FIG. 6B) produce a smaller pore size compared to the method 2 (FIG. 6C). In method 1, vibratory milling of the components forms a well-mixed slip but mixing of $Li_2CO_3$ with the Mazerustar® planetary mixer resulted in inhomogeneous distribution of the particle in the slip, which creates more voids (porosity) in the green ribbon. Mixing of all the slip components in method 2 with a Mazerustar® planetary mixer generated even larger pores in the green ribbon. The pore size data from the XCT image analysis for the three different kind of green ribbons is included in Table 6. A similar trend of the pore size shown in the microstructure of the fast fired ribbons from method 1 and 2 was observed in FIGS. 7 and 8.

TABLE 6

Pore size analysis in green porous ribbons

| Slip process | Length (3D) μm | Width (3D) μm | Eq. Diameter μm | Volume (3D) μm³ |
|---|---|---|---|---|
| Vib. milling | 0.5219412 | 0.275214275 | 0.303249 | 0.18851849 |
| Method 1 | 1.6107073 | 0.864284 | 0.89932415 | 163.55528 |
| Method 2 | 4.7488085 | 2.420959 | 2.48488575 | 484.033 |

The phase quantification by XRD analysis on the ribbons verifies successful formation of the garnet phase by reaction sintering between the precursor materials during fast firing at various temperatures. It also suggests that the cubic garnet phase decreases with the increase in firing temperature, as shown in Table 7.

TABLE 7

Cubic garnet phase content in the fast fired porous 0.5Ta-LLZO ribbons made by slip method 1 and 2.

| Fast Firing Temperature (° C.) | Phase quantification (wt. %) in fired ribbons from | |
|---|---|---|
| | Slip Method 1 | Slip Method 2 |
| 1200 | 80 wt. % cubic garnet | 93 wt. % cubic garnet |
| | 16 wt. % $La_2Zr_2O_7$ | 3 wt. % $La_2Zr_2O_7$ |
| | 3 wt. % $La_3TaO_7$ | 1 wt. % $La_2O_3$ |
| | 1 wt. % $Li_3TaO_4$ | 2 wt. % $La_3TaO_7$ |
| | | 1 wt. % $Li_3TaO_4$ |
| 1225 | 74 wt. % cubic garnet | 89 wt. % cubic garnet |
| | 21 wt. % $La_2Zr_2O_7$ | 5 wt. % $La_2Zr_2O_7$ |
| | 4 wt. % $La_3TaO_7$ | 1 wt. % $La_2O_3$ |
| | 1 wt. % $Li_3TaO_4$ | 5 wt. % $La_3TaO_7$ |
| | | 1 wt. % $Li_3TaO_4$ |
| 1250 | 74 wt. % cubic garnet | 83 wt. % cubic garnet |
| | 21 wt. % $La_2Zr_2O_7$ | 9 wt. % $La_2Zr_2O_7$ |
| | 5 wt. % $La_3TaO_7$ | 1 wt. % $La_2O_3$ |
| | 1 wt. % $Li_3TaO_4$ | 6 wt. % $La_3TaO_7$ |
| | | 1 wt. % $Li_3TaO_4$ |
| 1275 | 67 wt. % cubic garnet | 84 wt. % cubic garnet |
| | 25 wt. % $La_2Zr_2O_7$ | 8 wt. % $La_2Zr_2O_7$ |
| | 7 wt. % $La_3TaO_7$ | 1 wt. % $La_2O_3$ |
| | 1 wt. % $Li_3TaO_4$ | 6 wt. % $La_3TaO_7$ |
| | | 1 wt. % $Li_3TaO_4$ |

However, as the ribbons were prepared and fired on different days, different extent of air exposure of the garnet in the fired ribbons during sample storage and preparation for the analysis results in different amount of cubic phase content in the ribbons. Accordingly, the XRD data for the sintered ribbons (Table 7) does not directly compare % of cubic garnet (or any secondary phase content) between the fired ribbons made with method 1 and method 2.

Example 8

The fundamental mechanism for formation of lithium dendrites has been demonstrated. On discharge, lithium may be stripped non-uniformly to leave voids at the interface with a solid electrolyte. The tendency to form voids increases as the current density for discharge is increased. The loss of contact between lithium and a solid separator due to voids sensitizes the cell to dendrite formation. Local current densities and overpotentials at the edge of the voids are increased relative to the average current density. The relative increase scales as the number of voids and lost contact area grow. It has also been shown that that critical current density may be increased by applying pressure and operating at above room temperature. The applied pressure prevents voids from forming during stripping and lithium metal soften as temperature increases.

A porous anode structure, if properly designed, can provide an alternative to pressure and temperature to dramatically increase critical current density. Design of the anode and impact on critical current density is non-intuitive. A porous anode simultaneously increases surface area of the lithium-solid electrolyte interface for charge transfer. The increase is at the expense of a longer path for conduction of lithium ions. The cross-section for conduction of lithium into the porous garnet electrode will also be reduced especially as porosity is pushed higher to increase capacity. A reduced cross-section near the separator could in fact lead to increased local current density and reduce the observed critical current density.

Figure 9:
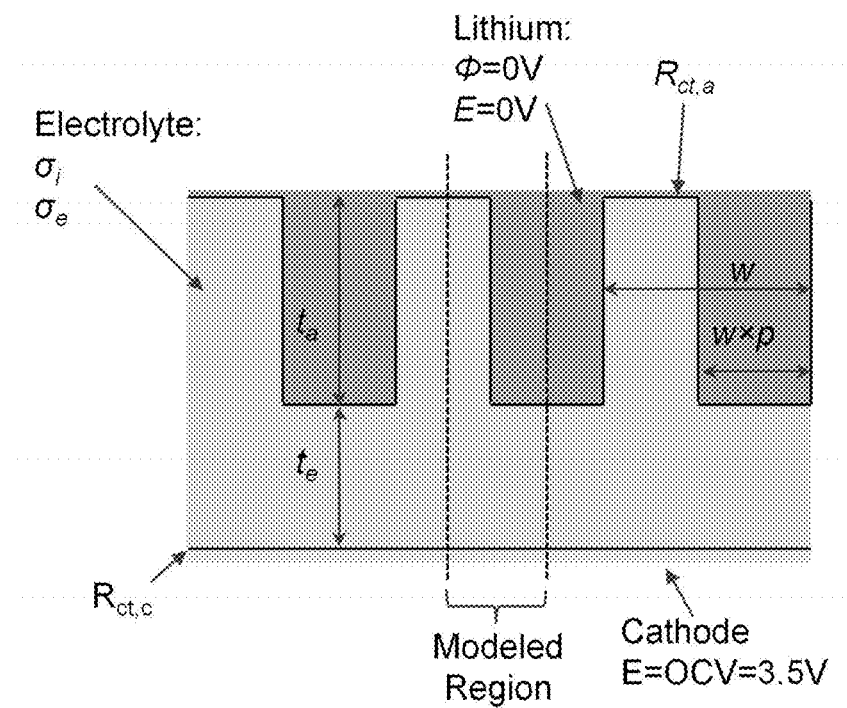
FIG. 9 is a model of a porous anode, a separator, and cathode in two dimensions.

To investigate these trade-offs and gain insight into what factors enable higher current density without dendrite formation; transport within a cell that comprises a porous anode, a separator, and cathode was modeled in two dimensions using the finite difference method. The model is shown in FIG. 9 was designed to be flexible so that a wide range of design parameters of the cell and porous anode can be explored. The pores and porosity are treated as simple trenches and the solid electrolyte particles are pillars in contact with the solid separator. The trench-pillar structure periodically repeats, and the periodicity is used to simplify modeling. Porosity and size of the grains and pores are linked to the pitch and width of the trench. The model provides solutions for local electrostatic potentials, electrochemical potentials of lithium, and current densities due to lithium ions and electrons. It may also be used to compute total cell resistance of a cell on an areal basis. It does not track state of charge and all rate processes are ohmic. The model is used here to explore local lithium ion current densities at the interface between lithium metal and the solid separator that drive dendrite formation.

Figure 10:
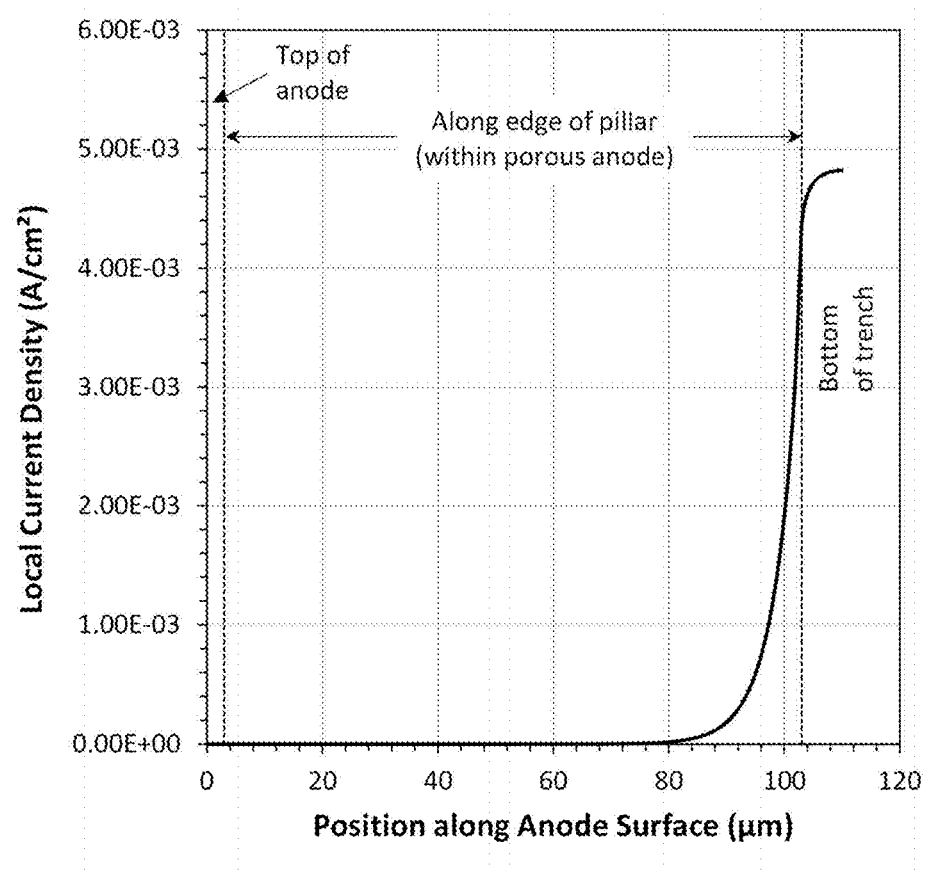
FIG. 10 is a plot of local current density at the electrolyte-lithium interface in a porous anode as function of position.

FIG. 10 is a plot of local current density at the electrolyte-lithium interface in the porous anode as function of position. With reference to FIG. 10, the position is traced starting at the upper left-hand corner of the modeled region and moving along the lithium-electrolyte interface and stopping at the lower right-hand corner, again of the modeled region. Transport parameters used in the model were selected to be relevant to batteries that utilize lithium metal anodes and garnet solid electrolytes in particular. They were also selected for consistency with values reported in the scientific literature without attempting to model a specific example. The electrolyte in the porous anode region and separator were assigned the same lithium ion and electronic conductivity $10^{-4}$ S/cm and $10^{-10}$ S/cm, respectively. The charge transfer resistance of the cathode is set to 40 Ωcm². The intrinsic charger transfer resistance at the lithium-electrolyte interface, e.g., in the flat state, was set to 5 Ωcm². The thickness of the electrolyte separator was chosen to be 10 μm. While this value may seem low for a solid electrolyte, it is expected that a low thickness would be present in a battery designed for high energy density. The porous anode was assigned a thickness of 100 μm, a porosity of 70%, and a pore diameter of 14 μm. The open circuit voltage of the cell (Nernst potential) was set to 3.5. Potentials within the electrolyte regions were solved at a fixed net cell current density of 5 mA/cm². The local current densities in the plot show how the porous structure redirects flow of lithium ions. Local current densities in the bottom of the trench, e.g., near the separator, are less than the applied net current density of 5 mA/cm². Some of the flow of lithium ions is re-routed into the pillar of the porous anode. The current density in that region is also less than 5 mAcm². It can also be seen to attenuate moving away from the separator as the conduction path grows longer. Regions of the porous anode more than 20 μm away from the separator do not appreciably contribute to current flow. Stated differently, the full area of the porous anode is not utilized and resistance of the cell does not decrease in proportion to the absolute internal surface area. The ability of the porous anode to reduce local current densities is helpful in limiting the effect of non-uniform stripping that can result in void formation. Even more importantly, the porous anode lower local current density even without voids due to stripping making the cell less sensitive to dendrite formation as compared to a flat anode.

Figure 11:
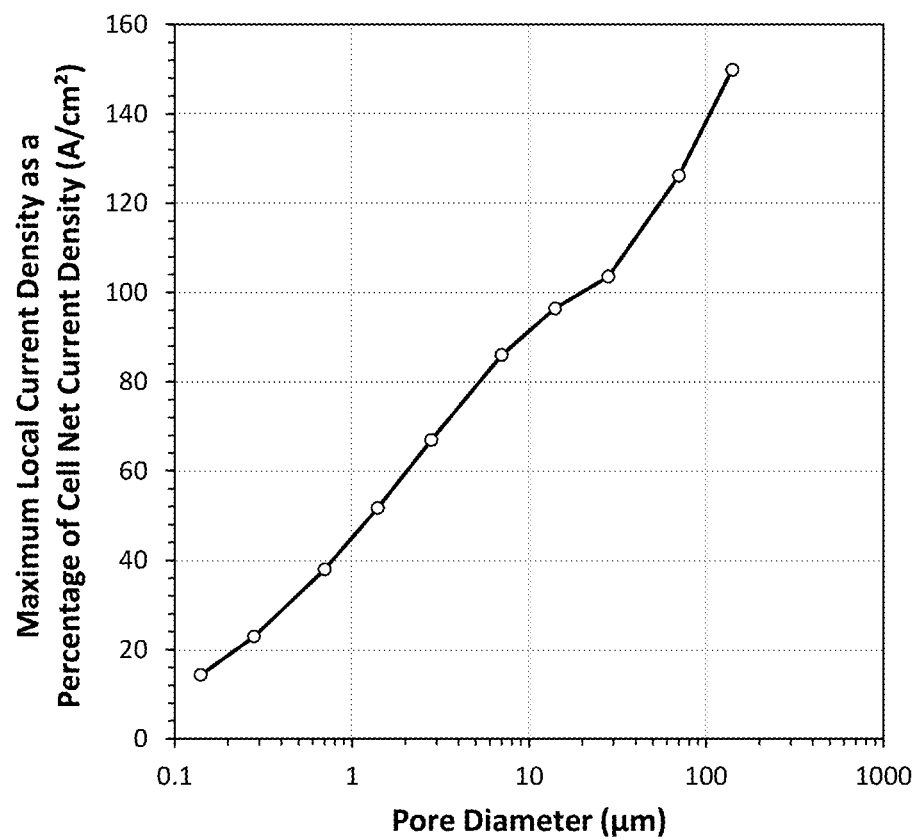
FIG. 11 is a plot of the maximum local current density relative to the 5 $mA/cm^2$ applied cell current density on a percentage basis as a function of pore size.

Based upon the above results, one can anticipate that current flow into the porous anode can be influenced by pore size. The model was used to investigate local current density for pore sizes between 0.14 and 140 μm while keeping other parameters described above constant. The tendency to form a dendrite or conversely be able to resist dendrite formation is reasonably expected to scale with the maximum local current density and local current density relative to the net cell current density at the lithium-electrolyte interface. The relative maximum is a more general quantity as it enables comparisons without invoking a specific operational condition. The maximum local current density relative to the 5 mA/cm² applied cell current density on a percentage basis is plotted in FIG. 11 as a function of pore size. The relative maximum current density can either exceed or be less than the average for the cell. Pore sizes below about 20 μm reduce local current densities and are expected to build in resistance to dendrite formation and lead to a higher critical current density. The maximum local current density also decreases with pore size. Reducing the pore size from 20 μm to about 1.4 μm lowers the maximum local current density by roughly half and effectively doubling the critical current density. Further reduction in the pore size to 0.3 μm leads to a local maximum current density that is only ⅕ the net cell current density. Pore sizes above 20 μm are to be avoided as the local average critical current density is higher than the cell average. For design of a porous anode, smaller pore sizes, both average and maximum, and especially near the interface with the solid separator are preferred.

Figure 12:
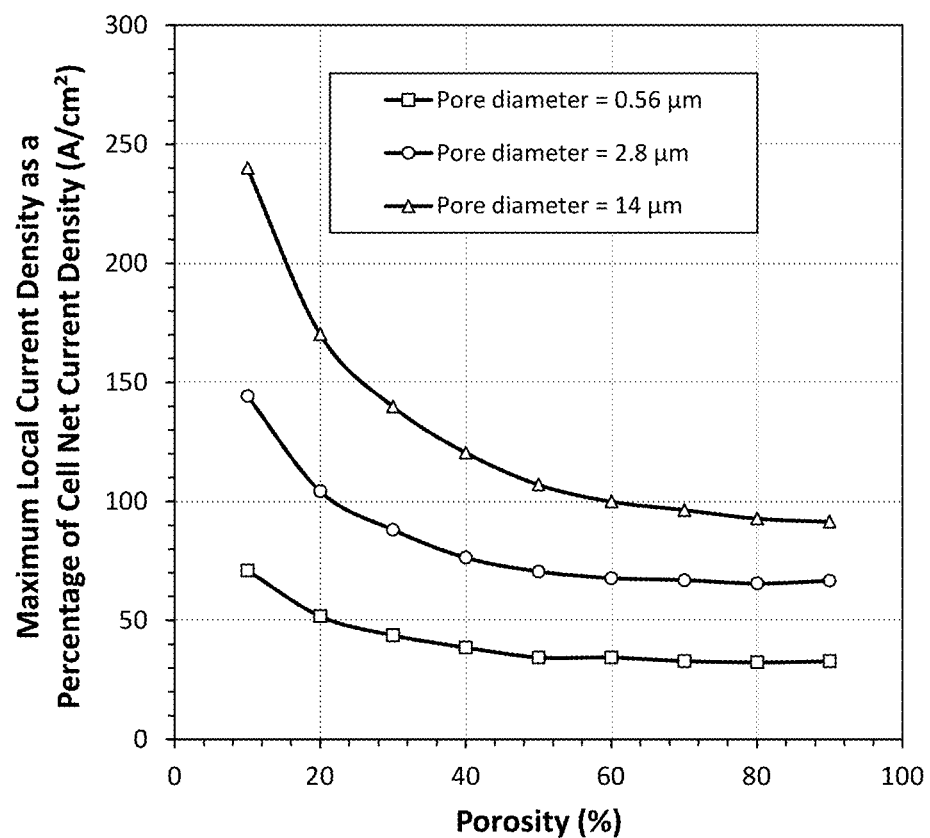
FIG. 12 is a plot of the maximum local current density on a relative basis from modeling as a function of porosity for three pore sizes 0.56, 2.8 and 14 µm.

Energy density of a battery is an important consideration. Ideally as much space in the form of porosity is made available to hold porosity. However, the available cross-section of solid electrolyte within the porous anode decreases as porosity grows. The reduced cross-section has a limited impact on maximum relative local current density. FIG. 12 shows the maximum local current density on a relative basis from modeling as a function of porosity for three pore sizes 0.56, 2.8 and 14 μm. The maximum local relative current density drops as porosity increases from 10% as more current is directed into the porous anode. At the same time the rate of decrease of the maximum relative current density slows as the porosity grows due to the shrinking cross-section into the solid-electrolyte. Surprisingly, the no minimum is observed up to a porosity of even 90%. Hence, increasing porosity of up to 90% in a porous anode is predicted to be beneficial and increase critical current density. As described herein, the plot in FIG. 12 also shows that smaller pores are more effective in reducing the maximum local relative current density. In addition, it shows that higher porosity is desirable to reduce the maximum local current density if pore size is for whatever reason large. For example, porosity should be above 60% if pores as large as 14 μm are present near the separator interface so the maximum relative local current density is no more than 100%.

The disclosure provides for the following example embodiments, the numbering of which is not to be construed as designating levels of importance:

Embodiment 1 relates to a ribbon comprising an open-pore lithium-ion conducting ceramic layer having a porosity of from about 50% to about 90% and a $d_{90}$ pore size of less than about 10 μm and the thickness of the open-pore lithium-ion conducting ceramic layer is between about half the $d_{90}$ and about 70 μm.

Embodiment 2 relates to ribbon of Embodiment 1, wherein the ribbon comprises lithium-garnet.

Embodiment 3 relates to the ribbon of Embodiment 1, wherein the d90 pore size is less than about 5 μm.

Embodiment 4 relates to the ribbon of Embodiment 1, further comprising a closed-pore lithium-ion conducting ceramic layer having a thickness of from about the median size of the pores in the open-pore lithium-ion conducting ceramic layer and 30 μm.

Embodiment 5 relates to the ribbon of Embodiment 4, wherein the closed-pore lithium-ion conducting ceramic layer and the open-pore lithium-ion conducting ceramic layer have substantially the same chemical composition.

Embodiment 6 relates to the ribbon of Embodiment 4, wherein the closed-pore lithium-ion conducting ceramic layer and the open-pore lithium-ion conducting ceramic layer have substantially a different chemical composition.

Embodiment 7 relates to the ribbon of Embodiments 1-6 The ribbon of any preceding claim, wherein the open-pore lithium-ion conducting ceramic layer is a sintered LLZO comprising at least about 65 wt. % of a cubic garnet phase.

Embodiment 8 relates to the ribbon of Embodiment 7, wherein the composition of the LLZO is $Li_{6.7-6.3}La_3Zr_{1.5}Ta_{0.3-0.7}O_{12}$ or $Li_{6.5}La_3Zr_{1.5}Ta_{0.5}O_{12}$.

Embodiment 9 relates to the ribbon of Embodiments 1-8, wherein the ribbon is Ta- or Al-doped.

Embodiment 10 relates to the ribbon of Embodiments 1-9, wherein the ribbon has a conductivity of at least about $10^{-5}$ S/cm.

Embodiment 11 relates to the ribbon of Embodiments 1-10, wherein the open-pore lithium-ion conducting ceramic layer has a db of less than 1, wherein the db is equal to $(d_{90}-d_{10})/d_{50}$.

Embodiment 12 relates to a method of making a ribbon, the method comprising: sintering a tape casted slip composition comprising $Li_2CO_3$, a lanthanum compound, $ZrO_2$, and at least one of a dispersant, solvent, plasticizer, binder, and defoamer, and substantially no pore forming agent, at a temperature of at least about 600° C. to give sintered LLZO.

Embodiment 13 relates to the method of Embodiment 12, wherein the lanthanum compound is $La_2O_3$ or $La(OH)_3$, Embodiment 14 relates to the method of Embodiment 12, further comprising preparing the tape casted slip composition.

Embodiment 15 relates to the method of Embodiment 14, wherein the $Li_2CO_3$, lanthanum compound, and $ZrO_2$ are first batched and jet milled to a particle size of $D_{50}$ of about 0.5 μm prior to preparing the tape casted slip composition.

Embodiment 16 relates to the method of Embodiment 14, wherein the $Li_2CO_3$, lanthanum compound, and $ZrO_2$ are first batched and water is added to give a mixed composition prior to preparing the tape casted slip composition.

Embodiment 17 relates to the method of Embodiment 16, wherein the mixed composition is subsequently ground.

Embodiment 18 relates to the method of Embodiment 14, wherein the tape casting slip is an organic tape casting slip.

Embodiment 19 relates to the method of Embodiment 14, wherein the tape casting slip is an aqueous tape casting slip.

Embodiment 20 relates to the method of Embodiments 14-19, further comprising casting the tape casting slip on a substrate.

Embodiment 21 relates to the method of Embodiment 20, wherein the substrate is a silicon-coated carrier film.

Embodiment 22 relates to the method of Embodiments 12-21, wherein the composition further comprises a dopant.

Embodiment 23 relates to the method of Embodiment 22, wherein the dopant comprises Ta or Al.

Embodiment 24 relates to the method of Embodiment 12, wherein the ribbon comprises at least about 75 wt. %, at least about 80 wt. % or at least about 85 wt. % of a cubic garnet phase.

Embodiment 25 relates to the method of Embodiments 12-24, wherein the ribbon comprises an open-pore lithium-ion conducting ceramic layer having a porosity of from about 50% to about 90% and a $d_{90}$ pore size of less than 10 μm and the thickness of the ceramic layer is between about half the $d_{90}$ and about 70 μm.

Embodiment 26 relates to the method of Embodiment 25, wherein the open-pore lithium-ion conducting ceramic layer has a db of less than 1, wherein the db is equal to $(d_{90}-d_{10})/d_{50}$.

Embodiment 27 relates to the method of Embodiments 12-26, wherein the ribbon has a conductivity of at least about $10^{-5}$ S/cm.

Embodiment 28 relates to the method of Embodiments 12-27, wherein the composition of the LLZO is $Li_{6.7-6.3}La_3Zr_{1.5}Ta_{0.3-0.7}O_{12}$ or $Li_{6.5}La_3Zr_{1.5}Ta_{0.5}O_{12}$.

Embodiment 29 relates to the method of Embodiments 12-28, wherein the total amount of Li present in the ribbon is equal to a stoichiometric amount of Li in the sintered LLZO.

Embodiment 30 relates to a battery comprising a ribbon of Embodiments 1-11 or a ribbon made by the method of Embodiments 12-29.

What is claimed is:

1. A method of making a sintered LLZO ribbon, the method comprising:
sintering a tape cast slip composition at a temperature of greater than or equal to 600° C. to produce the sintered LLZO ribbon, the tape cast slip composition comprising:
$Li_2CO_3$,
a lanthanum compound,
$ZrO_2$, and
at least one of the group consisting of: a dispersant, solvent, plasticizer, binder, and defoamer,
wherein the tape cast slip composition comprises substantially no pore forming agent,
wherein the sintered LLZO ribbon comprises an open-pore lithium-ion conducting ceramic layer comprising:
a porosity of from greater than or equal to 50% to less than or equal to 90%,
a $d_{90}$ pore size of less than or equal to 10 μm, and
the thickness of the open-pore lithium-ion conducting ceramic layer is from greater than or equal to half the $d_{90}$ pore size and less than or equal to 70 μm.

2. The method of claim 1, wherein the lanthanum compound is $La_2O_3$ or $La(OH)_3$.

3. The method of claim 1, further comprising preparing the tape cast slip composition.

4. The method of claim 3, wherein the $Li_2CO_3$, lanthanum compound, and $ZrO_2$ are first batched and milled to a $D_{50}$ particle size of less than or equal to 0.6 μm prior to preparing the tape cast slip composition.

5. The method of claim 3, wherein the $Li_2CO_3$, lanthanum compound, and the $ZrO_2$ are first batched and water is added to form a mixed composition, and the mixed composition is utilized to prepare the tape cast slip composition.

6. The method of claim 3, wherein the tape cast slip composition is an organic tape cast slip composition or an aqueous tape cast slip composition.

7. The method of claim 3, further comprising casting a tape casting slip composition on a substrate to form the tape cast slip composition.

8. The method of claim 7, wherein the substrate is a silicone-coated carrier film.

9. The method of claim 1, wherein the tape cast slip composition further comprises a dopant.

10. The method of claim 1, wherein the sintered LLZO ribbon comprises greater than or equal to 65 wt. % of a cubic garnet phase.

11. The method of claim 1, wherein the sintered LLZO ribbon comprises greater than or equal to 75 wt % of a cubic garnet phase.

12. The method of claim 1, wherein the sintered LLZO ribbon has a lithium-ion conductivity of greater than or equal to $10^{-5}$ S/cm.

13. The method of claim 1, wherein the total amount of Li present in the sintered LLZO ribbon is equal to a stoichiometric amount of Li in the sintered LLZO.

* * * * *